United States Patent
Bickett, III et al.

(10) Patent No.: US 6,808,098 B1
(45) Date of Patent: Oct. 26, 2004

(54) MULTI-HITCH FLAG MAST SUPPORT SYSTEM

(75) Inventors: Earl H. Bickett, III, 14061 River Rd., Ft. Myers, FL (US) 33905; Keith N. Bickett, Ft. Myers, FL (US)

(73) Assignee: Earl H. Bickett, III, St. Joseph, MI (US)

( * ) Notice: Subject to any disclaimer, the term of this patent is extended or adjusted under 35 U.S.C. 154(b) by 122 days.

(21) Appl. No.: 10/361,768

(22) Filed: Feb. 11, 2003

(51) Int. Cl.[7] ................ B60R 9/00; B60R 11/00; B60D 1/36
(52) U.S. Cl. ............ 224/512; 224/519; 280/511; 116/28 R; 116/173
(58) Field of Search ................ 224/519–521, 224/489, 512, 517, 547, 555, 557; 280/511, 491.5, 416.1; 248/511; 116/28 R, 173; 411/366.1, 367, 368, 366.2, 382, 509, 510

(56) References Cited

U.S. PATENT DOCUMENTS

| | | | |
|---|---|---|---|
| 3,643,902 A | | 2/1972 | Gualano |
| 4,433,854 A | * | 2/1984 | Smith ................ 280/511 |
| 4,632,354 A | | 12/1986 | Asciutto |
| 5,419,576 A | * | 5/1995 | Van Vleet ............ 280/511 |
| 5,727,497 A | | 3/1998 | Nichols, Jr. |
| 6,085,687 A | | 7/2000 | Chester |
| 2002/0189525 A1 | | 12/2002 | Nathan |
| 2003/0094473 A1 | * | 5/2003 | Moore ................ 224/519 |
| 2004/0041070 A1 | * | 3/2004 | Richardson ............ 248/511 |

* cited by examiner

Primary Examiner—Nathan J. Newhouse
(74) Attorney, Agent, or Firm—C. J. Husar, Esq.

(57) ABSTRACT

A flag mast holder assembly that can accommodate the three most popular trailer hitch ballmount bore diameters BD, namely, 1.0 inch, 0.874 inch and 0.75 inch. Mast holder assembly includes a central bore for receiving the mast of a flag or pennant and is preferably made of aluminum. The mast holder assembly is provided with stainless steel flat washers, lock washer and securing nut. The provision of stainless steel components with the aluminum mast body will be highly resistant to corrosion and oxidation and thus provide an attractive addition to anyone's vehicle. The preferred material is aluminum with stainless components as described above, however, the entire assembly and attaching hardware could be made of nylon, Teflon or suitable non-corrosive plastic materials.

12 Claims, 3 Drawing Sheets

MULTI-HITCH FLAG MAST SUPPORT SYSTEM

BACKGROUND OF THE INVENTION

The present invention relates generally to flag support systems and more specifically, it relates to flags and their supporting masts which are supported by a vehicle trailer hitch ballmount component when not used for towing.

As we have all witnessed in recent months since the events of Sep. 11, 2001, there has been a resurgence in patriotism throughout the nation. This re-energized patriotism has many forms of expression. Probably the most widely used form of expressing one's patriotism, is an expression of his love and respect for "Old Glory". As a result of this desire to express one's patriotism, flags have been attached to various parts of our autos, such as radio antennas, windows, bumpers and in some instances to the rain gutters of the auto's roof.

As one can imagine, considerable forces are exerted on a flag mast when one is driving at normal operating speeds within the speed limits. Thus, each of these above noted approaches to the securement of a flag mast has resulted, to a great extent, in failure of the flag mast at its point of securement to the vehicle.

In recent years, there has been an increase in the number of SUV's, vans and pick-up trucks, most of which are equipped with trailer hitches for pulling boats, camping trailers, or other recreational vehicles and equipment. As can be expected, these trailer hitches come in a variety of sizes, i.e., they are sized according to the loads that they will carry. As a result of the different load capacities, the ball that is attached to the ballmount of the trailer hitch is secured to the ballmount by a threaded shaft portion, which is available in a plurality of sizes. It has been found there are three commonly used ballmount shaft diameters currently in use, namely 0.75 in., 0.874 in. and 1.0 in. It can readily be seen that if the hitch ballmount has a bore diameter of 0.75 inches, a ball shaft diameter of 1.0 inches will not fit into the lesser diameter bore. Likewise, a hitch ballmount bore diameter of 1.0 inches will provide a loose or sloppy fit for ballmount diameters of 0.75 or 0.874 inches.

DISCUSSION OF THE PRIOR ART

A search of the Patent Office files in the appropriate classes was made and revealed the following prior art documents. U.S. Pat. No. 3,643,902 issued to Gualano on Feb. 22, 1972—this patent discloses a c-shaped clamping member 15 that engages the rain gutter 11 of an automobile to support an adjustable socket member 21 for supporting a flag therein.

U.S. Pat. No. 4,632,354 issued to Asciutto on Dec. 30, 1986—discloses a mast mounting for an ATV comprising a grip collar for securing the mast to the mounting bolt. There is no provision for a plurality of mounting bore diameters.

U.S. Pat. No. 5,727,497 issued to Nichols, Jr. on Mar. 17, 1998—discloses a flag system for displaying a flag from the hood of an automobile. It comprises an L-shaped member that is externally threaded on a vertical portion thereof and is received in a split flexible mast that includes external threads on the lower portion thereof for receiving a clamping nut 62.

U.S. Pat. No. 6,085,687 issued to Chester on Jul. 11, 2000—discloses a flag mounting system for securing a flag mast to the cross member of a roof luggage rack by means of a clamping member.

U.S. Pat Application Publication No. US2002/0189525 dated Dec. 19, 2002—discloses a detachable vehicle trailer hitch display flag apparatus that utilizes a collar 36 positioned in hole H and is provided with central aperture for snugly receiving the lower portion of the support shaft 22 which in turn receives the lower most end flagstaff 16. This publication includes some twenty-two citations of prior art, all of which have been reviewed to determine their pertinence to the subject invention. It has been found that none of these prior art documents deal with or even mention an awareness of the problem related to the issue of differing trailer hitch bore diameters presented by different ball shaft diameters.

SUMMARY OF THE INVENTION

In view of the above noted problem, applicant has designed a flag mast support system that will readily he accepted by any of the three noted poplar hitch ballmount bore diameters, namely 0.75 in., 0.874 in. and 1.0 in. The novel flag mast support includes a stepped shaft that corresponds to the above noted hitch ballmount bore diameters and also a stepped washer that corresponds to the diameters of the stepped shaft and another alternative washer that is used with the 0.874 ballmount shaft diameter. In order to accommodate the three different hitch ballmount bore diameters, this pair of washers, one stepped and the other a flat washer are provided to accommodate the 0.75 inch bore and 0.874 inch bore. When the hitch ballmount bore diameter is one inch, only a lock washer is provided and installed before the locking ¾ inch nut is secured on the shaft. The novel flag mast support system can he advantageously used to fly the banners of one's favorite pro sports team, college banners, high school team or little league banners.

OBJECTS OF THE INVENTION

An object of the invention is to provide a flag mast support system that is convenient and readily adaptable to most trailer hitch ballmount shaft diameters.

A further object of the invention is to provide a flag mast support system that is inexpensive and provides the required strength to withstand mast pressure when driving.

A still further object of the invention is to provide a trailer hitch mast support assembly that will not corrode or oxidize and retain a pleasing appearance once installed Another object of the invention is to provide a flag mast support system that allows for the easy installation of one's favorite team banner thereon.

A still further object of the invention is to provide a flag mast support system that includes accommodations for installation on SUVs, pick-up trucks, vans or passenger vehicles that are equipped with trailer hitch ballmount hook-ups.

These and other objects of the invention will become more apparent hereinafter. The instant invention will now the described with particular reference to the accompanying drawings wherein like reference characters designate the corresponding parts throughout the several views.

DETAILED DESCRIPTION OF THE DRAWINGS

Figure 1:
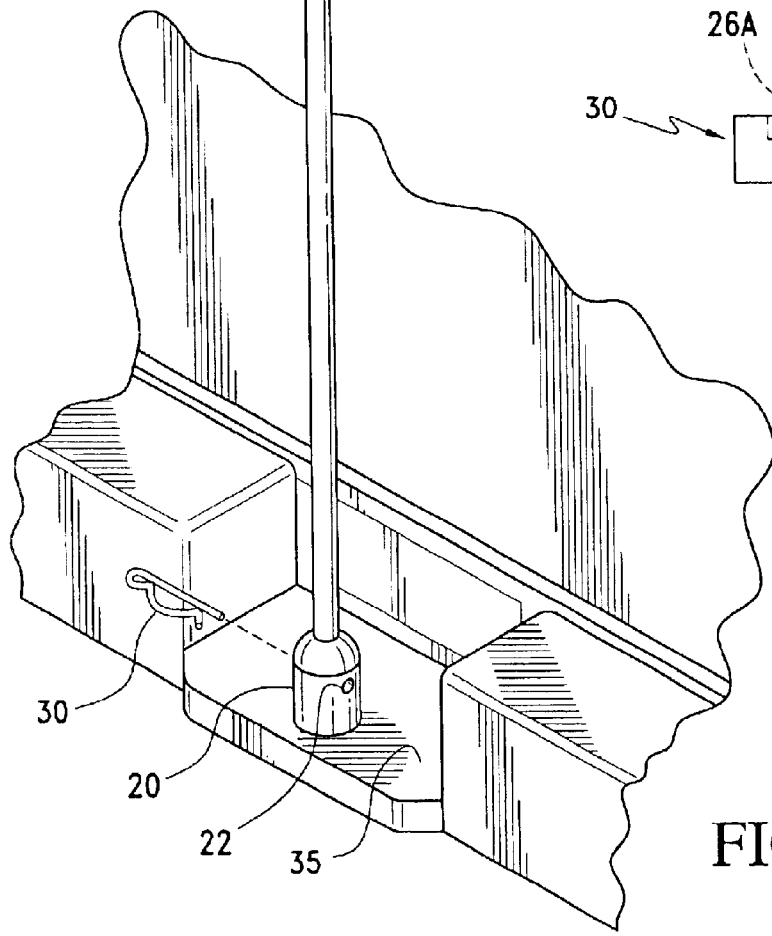
FIG. 1 is a perspective view of the novel trailer hitch flag mast support system in place with a flag secured on a conventional step bumper.

Referring now to FIG. 1, there is shown the novel flag mast support system with a flag or pennant 10 and its mast 15 securely mounted in mast holder 20 and retainer clip 30 about to he inserted into mast holder 20 thru mast 15 and out the other side of mast holder 20. As illustrated, trailer hitch ballmount 35 has a ballmount shaft bore diameter of 1.0 inches and therefore, the one-inch step diameter of mast holder 20 fits into the shaft bore diameter BD without any need for a spacer to compensate for any diameter differences between the ballmount diameters. In this view, a pick-up step-type rear bumper is illustrated with a supporting surface 35 for mounting a trailer hitch towing hall which has been removed to allow for the flag mast support system.

Figure 2:
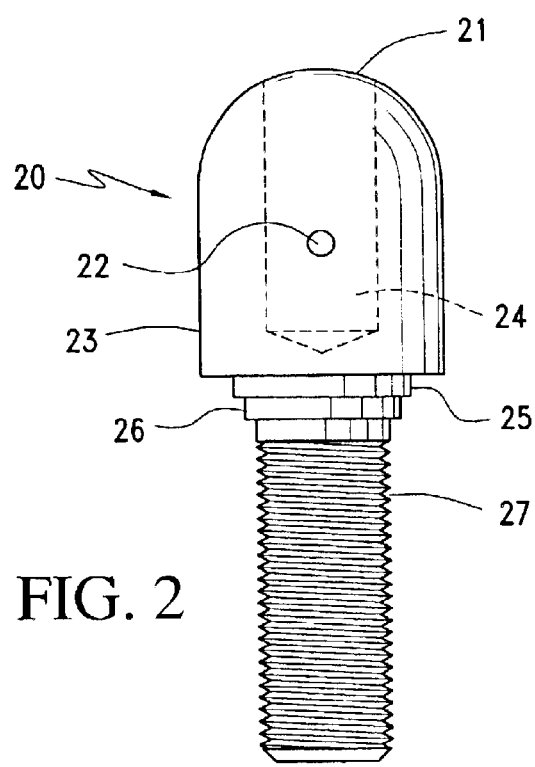
FIG. 2 is an illustration of the flag mast support per se.

Turning to FIG. 2, there is shown the mast holder 20 per se. As illustrated mast holder 20 includes a dome-like uppermost portion 21 and an elongated cylindrical outer portion 23. Centrally located within mast holder 20 is an inwardly extending bore 24 for receiving the mast 15 of any flag or pennant/banner inserted therein. At the bottom of cylindrical portion 23 is a first step portion 25 having a diameter of one inch followed by a second step portion 26 having a diameter of 0.875 inches that is followed by a third step portion having a diameter of 0.750 inches which is the diameter of the entire threaded shaft portion 27.

Figure 3:
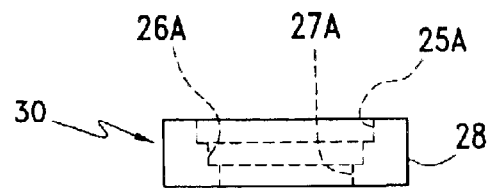
FIG. 3 is an illustration of a spacer that is used in conjunction with flag mast support when used with a 0.75 inch trailer hitch ballmount bore diameter.

FIG. 3 is an illustration of a stepped spacer 30 that is used with mast support 20, it has two stepped internal diameters, namely 25A, and 26A. These two internal diameters correspond to the two larger step diameters 25, and 26 respectively, of mast support 20. The outside diameter 28 of stepped spacer 30 is 13⁄8 inches and internal steps 25A and 26A matingly correspond to the external step diameters 25, and 26 of mast support 20. This stepped spacer 30 is used in conjunction with a trailer hitch ballmount shaft bore diameter of 0.750 inches and will be explained in greater detail with respect to FIG. 6.

Figure 4:
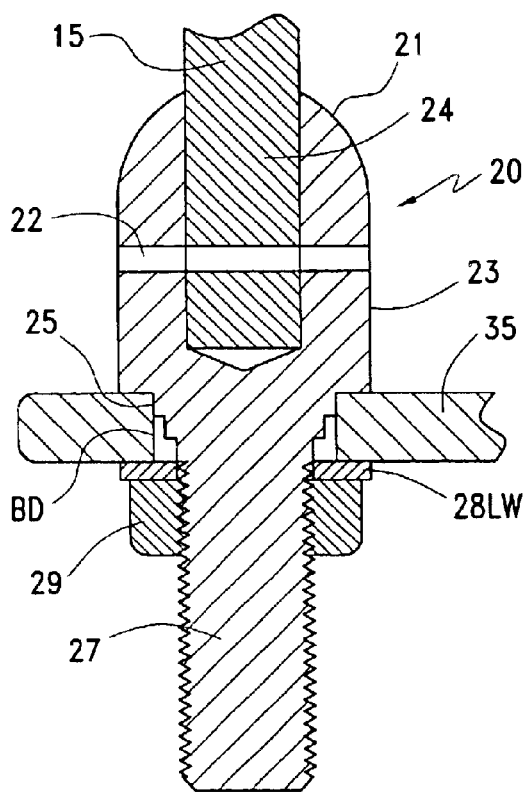
FIG. 4 is an assembled view of the novel flag mast support system when used with a 1.0 inch trailer hitch ballmount bore diameter.

Referring now to FIG. 4, there is shown the flag mast holder 20 in assembled relation to trailer hitch ballmount 35. A flag mast 15 is shown partially extending from flag mast holder 20. In this embodiment, the bore diameter BD through the trailer hitch ballmount 35 is 1.0 inches and as such, step portion 25 of mast holder 20 fits into the 1.0 inch diameter bore. Next, a lock washer 28LW is placed over the free end of threaded shaft 27, followed by ¾ in, nut 29 to securely hold mast holder 20 in place relative to hitch ballmount 35.

Figure 5:
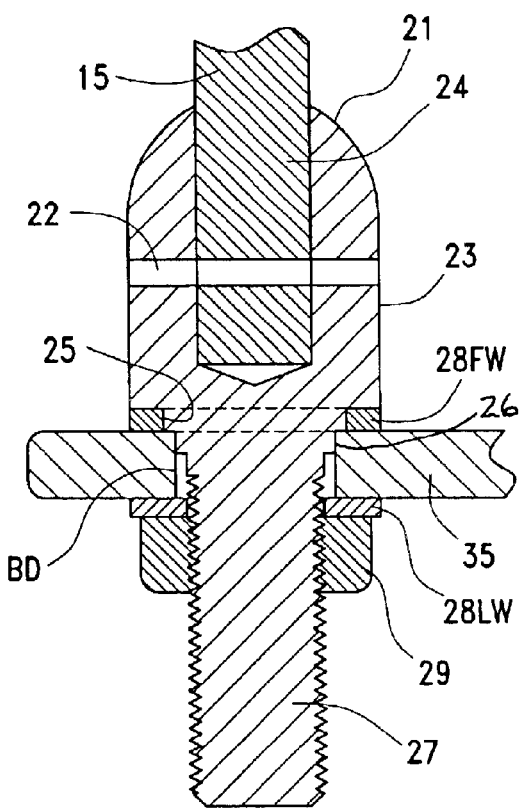
FIG. 5 is an assembled view of the novel flag mast support system when used with a 0.874 inch trailer hitch ballmount bore diameter.

Referring now to FIG. 5, there is shown a view similar to FIG. 4, however, in this view, the bore diameter BD of trailer hitch ballmount 35 is 0.874 inches which corresponds to step 26 of mast holder 20. Accordingly, a flat washer 28FW is placed over threaded shaft 27 and includes an inner diameter of 1.0 inch that conforms to the exterior diameter of step 25 and provides a firm contacting surface with respect to the upper surface of hitch ballmount 35 when lock washer 28LW and nut 29 are placed onto and threaded up threaded shaft 27.

Figure 6:
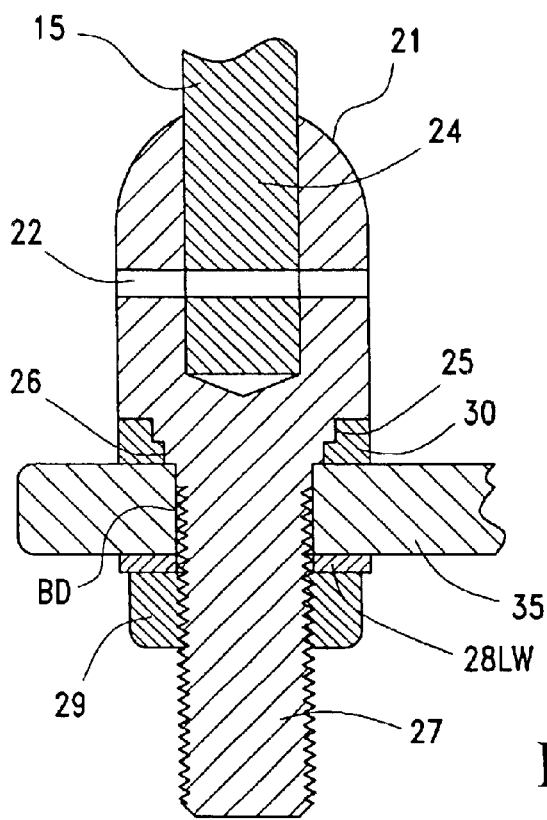
FIG. 6 is an assembled view of the novel flag mast support system when used with a 0.750 inch trailer hitch ballmount bore diameter.

Referring now to FIG. 6, there is shown another view similar to FIGS. 4 and 5, however, in this view, the third possibility is illustrated, namely, a 0.750 inch trailer hitch ballmount bore diameter BD in ballmount 35. As shown, stepped spacer 30 is placed over threaded shaft 27 before it is inserted into bore diameter BD. By means of stepped spacer 30, the stepped portions of threaded shaft 27 are matingly received therein and provide a solid support area for mast holder 20 when nut 29 is tightened.

Figure 7:
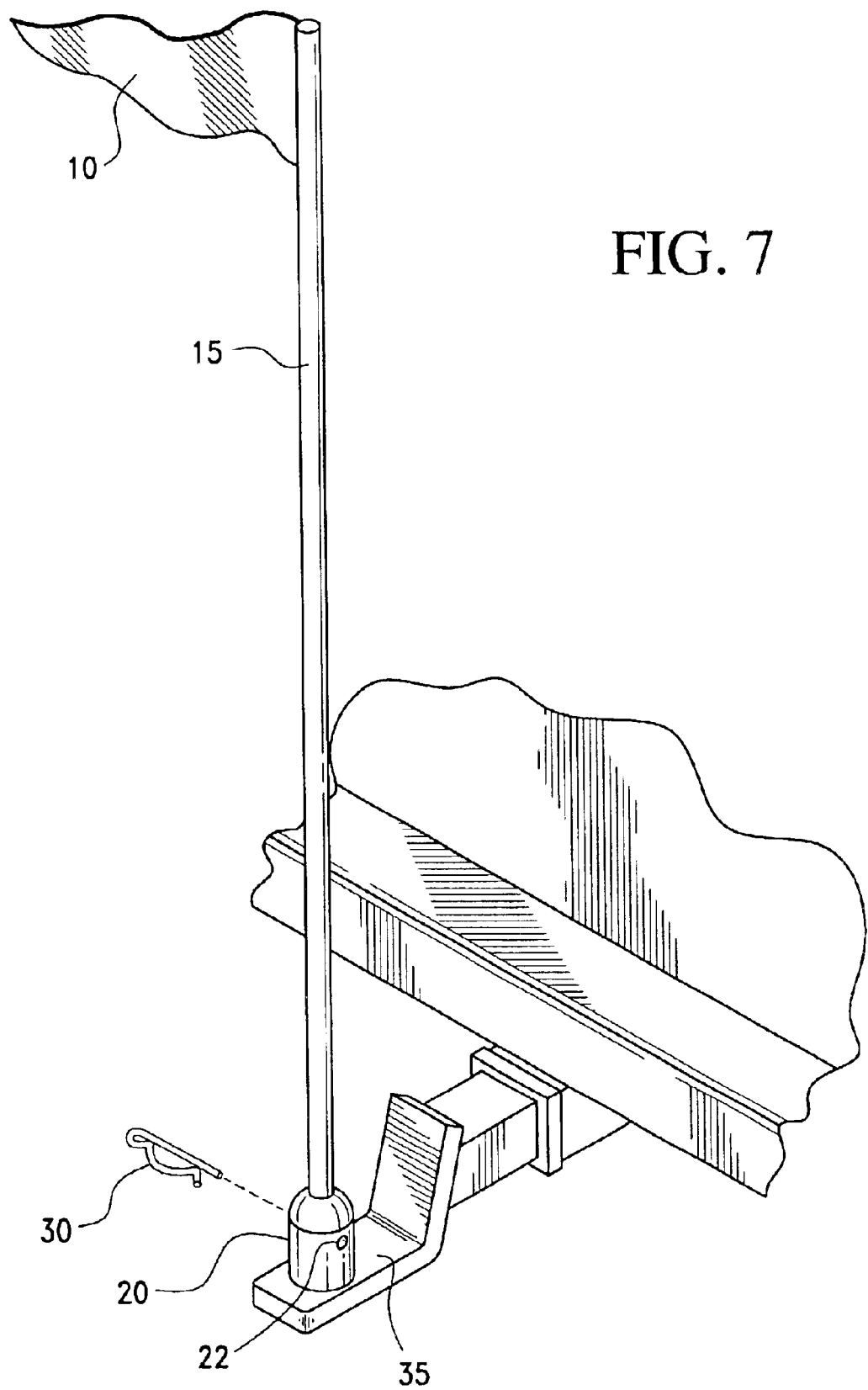
FIG. 7 is another perspective similar to FIG 1, illustrating a trailer hitch flag mast support system in conjunction with a conventional trailer hitch ballmount component

Referring now to FIG. 7, there is shown a perspective view similar to FIG. 1, however, in this view the flag mast holder 20 is mounted in the ballmount 35 of a trailer hitch after the towing hall (not shown) has been removed. As indicated above with respect to FIG. 1, trailer hitch towing balls come in a variety of sizes to accommodate a variety of load capacities. Here again, the three most commonly used sizes are 1.0 inch, ⅞ inch and ¾ inch. The mast holder 20 can be readily used with each of these three sizes to securely mount a flag mast 15 therein in the same manner as described above with respect to the figures set forth above.

By way of review, it is pointed out that applicant has provided a novel mast holder assembly 20 that can accommodate the three most popular trailer hitch ballmount bore diameters BTD, namely, 1.0 inch, 0.0874 inch and 0.075 inch. The mast holder 20 is preferably made of aluminum and is provided with stainless steel flat washers and lock washer and securing nut 29. The provision of stainless steel components with the aluminum mast body will he highly resistant to corrosion and oxidation and thus provide an attractive addition to anyone's vehicle. However, the entire assembly may be made of nylon, Teflon or other suitable plastic material that will not rust or oxidize.

While the invention has been described in its preferred embodiment, it is to be understood that the words which have been used are words of description rather than words of limitation and that changes may be made within the purview of the appended claims without departing from the full scope or spirit of the invention. Accordingly, the present invention is to he limited only by the appended claims, and not by the foregoing specification.

Having thus described our invention, we claim:

1. A flag mast support system for displaying a flag from a trailer hitch ballmount comprising in combination:
   trailer hitch ball mounting means for receiving a towing ball when used in the towing mode;
   said trailer hitch ball mounting means including bore means corresponding to one of several different bore diameters;
   flag mast support means including a first cylindrical portion with a central inwardly directed bore therein for receiving a flag mast therein;
   said flag mast support means having a plurality of diametral base supporting surfaces for selective alternative engagement with one of said several different bore diameters of said ball mounting means;
   said flag mast support means further including shaft attaching means for engagement with one of said ball mounting bore diameters and securement thereto; whereby said flag mast support means can be inserted into any one of said several different bore diameters to securely receive and hold a flag therein.

2. A flag mast support system for displaying a flag from a trailer hitch ballmount as defined in claim 1 wherein said flag mast support means further includes a stepped diameter spacer member that corresponds to said plurality of diametral base supporting surfaces of said flag mast support means and is used to stabilize and provide support to said flag mast support means when mounted in one of said plurality of trailer hitch hall mounting bore diameters.

3. A flag mast support system for displaying a flag from a trailer hitch ballmount as defined in claim 1 wherein said flag mast support means is made of aluminum and the remaining components are made of stainless steel.

4. A flag mast support system for displaying a flag from a trailer hitch ballmount as defined in claim 1 wherein said flag mast support means and the remaining washers, spacer and nut are each made of stainless steel.

5. A flag mast support system for displaying a flag from a trailer hitch ballmount as defined in claim 1 wherein said flag mast support means is made of nylon or other suitable plastic material.

6. A flag mast support system for displaying a flag from a trailer hitch ballmount as defined in claim 1 wherein said first cylindrical portion of said flag mast support system includes a transverse bore therethrough for receiving a retaining clip to hold a flag mast in said central bore when a flag is positioned therein.

7. A flag mast support system for receiving and supporting the mast of a flag when inserted therein; said flag mast support system comprising a first cylindrical portion having an upper surface;

said upper surface including an inwardly directed centrally located bore for receiving and supporting a mast of a flag when inserted therein;

said first cylindrical portion having a lowermost portion that comprises a plurality of stepped diminishing diameters, each of which is of lesser diameter than said first cylindrical portion;

said flag mast support system further including a spacer having a plurality of stepped diameters corresponding to said stepped diameters of said first cylindrical portion;

the smallest of said diameters of said lowermost portion of said first cylindrical portion comprising a threaded shaft portion whereby said spacer is placed over said threaded shaft portion prior to its insertion into in a trailer hitch tongue bore when the hitch ball is removed therefrom and said flag mast support system is secured therein by an appropriately sized securing nut threaded onto said threaded shaft portion of said flag mast support system.

8. A flag mast support system for displaying a flag as defined in claim 7 wherein said upper surface of said first cylindrical portion is domed-shaped.

9. A flag mast support system for displaying a flag from a supporting surface having any one of three possible bore sizes therethrough; said flag mast support system comprising;

a trailer hitch hall mounting surface leaving a bore of a particular diameter when said towing ball is removed therefrom;

a first cylindrical portion having a domed upper surface;

an inwardly directed bore in the upper surface of said domed portion for receiving the mast of a flag when inserted therein;

said first cylindrical portion having a lowermost portion that includes a plurality of stepped diminishing diameters, each of which is of lesser diameter than said first cylindrical portion and represents one of a series of commonly used ballmount shaft diameters;

the least diameter of said plurality of stepped diameters comprising a shaft that corresponds in diameter to one of said three possible bore diameters left by a trailer hitch ball when removed therefrom and said flag mast support system is received therein.

10. A flag mast support system as defined in claim 9 wherein said trailer hitch ballmount bore diameter is ¾ inches.

11. A flag mast support system as defined in claim 9 wherein said trailer hitch ballmount bore diameter is ⅞ inches.

12. A flag mast support system as defined in claim 9 wherein said trailer hitch ballmount bore diameter is 1.0 inches.

* * * * *